United States Patent [19]

Wang et al.

[11] Patent Number: 4,526,933
[45] Date of Patent: Jul. 2, 1985

[54] POLYMERIC ACTIVE METHYLENE COMPOUNDS, THEIR PREPARATION AND THEIR USE IN AZO POLYMERS

[75] Inventors: Patricia C. Wang, Palo Alto; Daniel J. Dawson, Los Altos, both of Calif.

[73] Assignee: Dynapol, Palo Alto, Calif.

[21] Appl. No.: 581,445

[22] Filed: Feb. 17, 1984

Related U.S. Application Data

[62] Division of Ser. No. 319,624, Nov. 9, 1981, abandoned.

[51] Int. Cl.³ .................................................. C08F 8/30
[52] U.S. Cl. .............................. 525/326.8; 525/328.2; 525/328.6; 525/333.3; 525/376; 424/81
[58] Field of Search ............... 525/326.8, 328.2, 328.6, 525/376, 333.3; 424/81

[56] References Cited

U.S. PATENT DOCUMENTS

3,607,834  9/1971  Marx et al. ........................... 526/316
4,011,201  3/1977  Ponticello ........................... 526/316
4,296,226  10/1981  Braun et al. ........................ 526/316

FOREIGN PATENT DOCUMENTS

2142419  8/1971  Fed. Rep. of Germany .

OTHER PUBLICATIONS

C.A., vol. 84, 1976, 84:180840g, Panarin et al.
C.A., vol. 83, 1975, 9544b, Krause et al.
C.A., vol. 80, 1974, 48525d, Plate et al.

Primary Examiner—Bernard Lipman
Attorney, Agent, or Firm—Burns, Doane, Swecker & Mathis

[57] ABSTRACT

Polymer compounds which have recurring

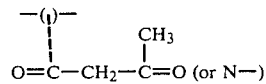

units are disclosed. These polymers provide active methylene groups which serve as points of attachment for organic groups—particularly azo functionality-containing groups. These azo links can be cleaved by bacteria in the mammalian lower bowel, thereby releasing the corresponding amino groups. This mechanism can effect programmed delivery of pharmaceutically desirable species to the lower bowel.

16 Claims, No Drawings

POLYMERIC ACTIVE METHYLENE COMPOUNDS, THEIR PREPARATION AND THEIR USE IN AZO POLYMERS

This application is a division of application Ser. No. 319,624, filed Nov. 9, 1981, now abandoned.

BACKGROUND OF THE INVENTION

1. Field of the Invention

The invention is in the field of polymer chemistry. More particularly, it concerns polymers having active methylene groups that may be used as reactive sites.

2. Prior Art

The concept of a polymer which provides a plurality of sites for reaction or coupling is well known. Most commonly, the active sites on such polymers are amines, alcohols, acids or some other heteroatom functionality that can serve as a coupling or reaction site. The following commonly assigned patents show such materials: U.S. Pat. No. 4,182,885 of Bunes shows that amine groups of a polymeric or copolymeric amine will couple to a haloanthraquinone under the influence of a copper catalyst. U.S. Pat. No. 4,169,203 of Wingard et al shows that amine groups of a polymeric amine can be acetylated to give acetamides. Probably more in point to the present invention, U.S. Pat. Nos. 4,190,716 of Parkinson et al and 3,920,855 of Dawson et al respectively show that certain types of azo-group bearing polymeric drugs and dyes can be constructed on polymeric backbones. These dyes and drugs are prepared by forming a polymeric aromatic amine, diazotizing the amino groups and then coupling this polymeric diazonium compound to units of an active carbon-bearing aromatic. This process can work well in many preparations. However, it will be appreciated that some specific couplings are not possible, especially when the aromatic desired to be coupled has groups that sterically block or deactivate the specific location sought to be the active site. For example, U.S. Pat. No. 4,190,716 shows that a polymeric azo prodrug of the pharmaceutical, 5-aminosalicylic acid can be formed by coupling salicylic acid to a diazotized aromatic backbone i.e.

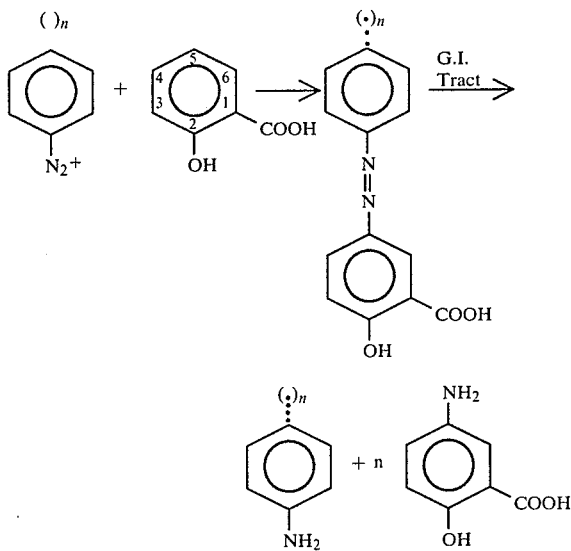

The hydroxyl group activates the 5-position carbon; this results in the coupling being essentially exclusively in that position. While this activation is ideal in the case just described, it is most unfortunate if another isomer, such as one coupled at the 4 position, is desired. It was sought to make the 4-aminosalicylic acid analog of the above-described 5-aminosalicylic acid-releasing polymers. 4-Aminosalycylic acid is a well known pharmaceutical and such a polymer would be advantageous. Use of the chemistry taught by U.S. Pat. No. 4,190,716 failed to give the desired product. Neither did variations of that chemistry.

What is needed is a process and polymer that would provide a plurality of active methylene sites which can serve as points for facile attachment of molecules already containing active groups (e.g. diazonium groups, carbonyl groups, etc.).

STATEMENT OF THE INVENTION

It has now been found that polymers containing recurring

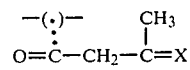

groups wherein X is O or N— provide active methylene groups as sites for attachment. These polymers can be formed by reacting a polymer backbone with diketene. Such an active polymer comprises recurring units of the structure

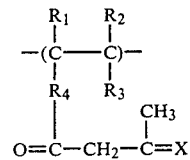

wherein X is O or N—; $R_1$, $R_2$ and $R_3$ are each independently selected from hydrogen and 1-4 carbon lower alkyls; and $R_4$ is selected from —O—,

aromatic hydrocarbons, aromatic amines, and aromatic hydrazines that in turn direct and provide X as N— (i.e. a pyrazolone).

Another aspect of this invention involves polymers having recurring,

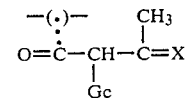

groups wherein X is as previously defined and Gc is a coupled organic group covalently attached to the polymer. A preferred embodiment of this invention is obtained when Gc is an azo-linked aromatic group, particularily 4-azosalicylic acid, more particularly with recurring

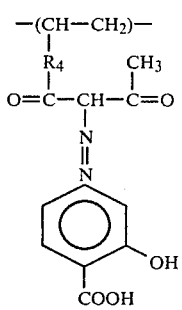

groups.

In further aspects, this invention provides azo-linked compounds which have backbones of a size to preclude their absorption through the intestinal lumen but which undergo azo bond cleavage in the mammalian lower bowel to release the azo-linked species, especially therapeutic agents, as well as pharmaceutical dosage forms incorporating such compounds for delivery of the released species in the colon while the polymer passes through the gut unabsorbed.

In a particularly preferred aspect this invention provides a polymeric compound which by its nature permits the controlled administration of 4-aminosalicylic acid (also known as p-aminosalicylic acid and PAS) to a mammal as well as a method for such administration.

DETAILED DESCRIPTION OF THE INVENTION

Definitions

In the present description and claims, reference will be made to several terms which are expressly defined as follows:

The term "pharmacologically acceptable organic polymer backbone" shall mean a polymer backbone which is devoid of structural groups or atoms which are toxic or give rise to an adverse physiological response in mammals when ingested.

The terms "pharmaceutically acceptable organic polymer backbone" shall have the same meaning. Similarly, the terms "pharmaceutically acceptable" and "pharmacologically acceptable", when used to describe salts, cations, carriers, or the like, shall have the same meaning and shall mean a material which is devoid of groups which are toxic or give rise to an adverse physiological response in mammals when ingested.

The terms "average molecular weight" and the like shall designate a mean molecular weight as determined by gel permeation chromatography comparison with known standard molecular weight polymers.

The term "molecular size which precludes absorption through the intestinal lumen" shall mean a molecular size that is larger than the maximum molecular size which can readily pass through the mammalian intestinal wall.

The term "recurring" is used to describe repeating units in a polymer chain. As so used, the term is intended to encompass not only the situation wherein a single unit repeats in a "homopolymer" structure, but also the situation wherein a unit appears in a polymer chain interspersed with other different units in a "copolymer" structure.

STRUCTURE OF THE ACTIVE METHYLENE FUNCTIONALITY

The "active methylene" functionality in the present polymers is a

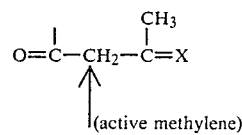

molecular unit wherein X is O or N—.

This molecular unit can also form chelates with metal ions ($M^{n+}$) through its X— and O= atoms in a

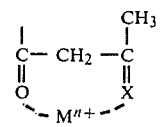

configuration wherein X is as defined and $M^{n+}$ is a monovalent or polyvalent metal ion.

STRUCTURE OF THE POLYMERS

Such a functionality is incorporated into polymers as recurring

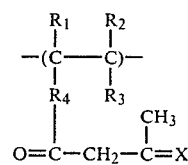

groups wherein $R_1$ $R_2$ and $R_3$ are independently hydrogens or lower alkyls, such as of from 1 through 4 carbons. Preferably these groups are all hydrogens. $R_4$ is an oxygen (—O—), secondary amine

aromatic hydrocarbon, aromatic amine,

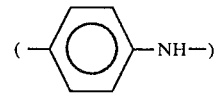

aromatic hydrazine (which will provide X as N—, as well) or the like. X is O or N—. A mixture of more than one of these groups can be used. Copolymers supplying these and optionally other groups can be used as well.

In addition to these materials where $R_4$ is pendant from the backbones, polymers which incorporate $R_4$ into the backbone can be employed. These include, for example, poly(ethylenimine) which provides

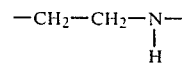

units; diallylamine polymers which provide

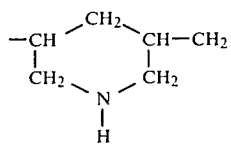

units; polymeric hydrazines which can yield

structures and polymeric aromatics such as poly(ethylene terephthalate) which can yield

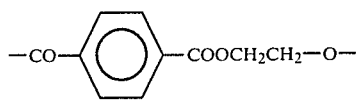

units and the like.

Thus, depending upon $R_4$, the polymers can be based on polymeric amines, polymeric alcohols, polymeric anilines, polymeric aromatic hydrocarbons and polymeric phenylhydrazines as well as copolymers of these groups. Example of each of these groups are given in Table I.

TABLE I

Representative Polymer Backbones

Polymeric Amines
Poly(vinylamine)
Copoly(vinylamine-vinylsulfonate)
Copoly(vinylamine-ethylene)
Copoly(vinylamine-acrylic acid)
Poly(ethylenimine) - branched and linear
Poly(2-aminoethylmethacrylate)

Polymeric Alcohols
Poly(vinylalcohol)
Copoly(vinylalcohol-ethylene)
Poly(glycidol)
Copoly(vinylacetate-vinyl alcohol)
Poly(ethylene glycol)
Copoly(ethyleneoxide-glycidol)

Polymeric Aromatics
Poly(styrene)
Copoly(styrene-butadiene)
Copoly(styrene-allyl alcohol)
Copoly(styrene-maleic anhydride)

Polymeric Anilines
Poly(p-aminostyrene)
Copoly(p-aminostyrene-p-sodium styrene sulfonate)
Poly(N$^1$—vinylsulfanilamide)
Copoly(N$^1$—vinylsulfanilamide-sodium vinyl sulfonate)

Polymeric Phenlhydrazine:
Poly(p-vinylphenylhydrazine)
Poly(N—vinyl-[p-hydrazino] benzenesulfonamide)
Copoly(N—vinyl-[p-hydrazino] benzenesulfonamide-sodium vinyl sulfonate)

These polymers are representative. Other functionally equivalent polymers can be substituted. The exact polymer employed will at least in part be based on the chemical and physical properties (such as solubility and the like) desired.

MOLECULAR SIZE

The molecular size of the polymeric backbone can be selected over a wide range such as from about 500 to 500,000 daltons. Larger backbones can be used as well. In certain instances, it is of advantage to employ backbones that are of a size that precludes absorption of the polymers through the walls of the gastrointestinal (G.I.) tract. This allows the backbone and any groups stably bonded thereto to pass through the G.I. tract without absorption. (This feature of large polymers is described in the commonly assigned United States Patents listed in the Background). Absorption is generally minimized when the backbones have a weight of at least 1000 daltons, preferably 1000 to 500,000 daltons.

When the polymers are employed in consumable or pharmaceutical products, they should be pharmaceutically acceptable.

REACTIONS WITH THE ACTIVE METHYLENE GROUPS

Various reactions can be carried out with the active methylene groups including coupling of diazonium salts, condensation with aldehydes or ketones and Mannich reactions. In addition the molecular units which provide the active methylenes can complex with metal ions. The diazonium salt coupling is of primary interest as it provides a widely used linkage that has the property of being stable in most conditions but of being broken by mammalian lower bowel conditions. When used with non-absorbably large backbones, this opens a variety of opportunities to use this link to specifically and controllably release materials into the lower bowel.

STRUCTURE OF POLYMERIC AZO LINKED SALICYLIC ACIDS

Particularly favored products of this invention are polymeric azo linked salicylic acids. When these materials are cleaved they give rise to aminosalicylic acids, i.e. 3-aminosalicylic acid, 4-aminosalicylic acid, and 5-aminosalicylic acid. A simple example of this reaction is shown as follows:

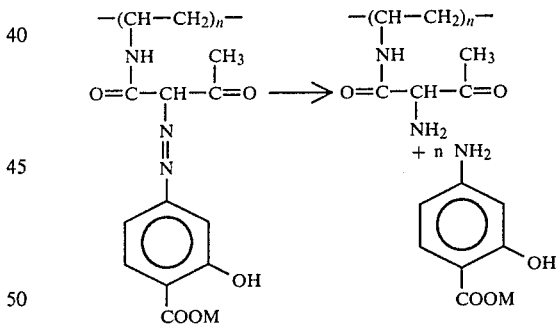

wherein M is hydrogen or a pharmacologically acceptable cation selected from among ammonium and the pharmacologically acceptable metal cations such as the nontoxic metal cations found in period 3, groups I, II and III; and period 4, groups I, II and VIII of the Periodic Table of the Elements, i.e., cations of Na, K, Mg, Ca, Fe and Al. Preferably, M is hydrogen, or cations of Na or K so that the group is present as a salicylic acid group or as a sodium or potassium salicylate salt. Most preferably, M is sodium such that the group is a sodium salicylate group. The present invention is not limited to aminosalicylic acids. Other species include other diazonium salts (for polymeric dyes) as shown in Table II, metal salts for polymeric chelates, and carbonyls which can, under some conditions dehydrate to olefinic bonds.

TABLE II
Representative Coupled Groups
Diazonium Salts That Couple To Give Polymeric Dyes

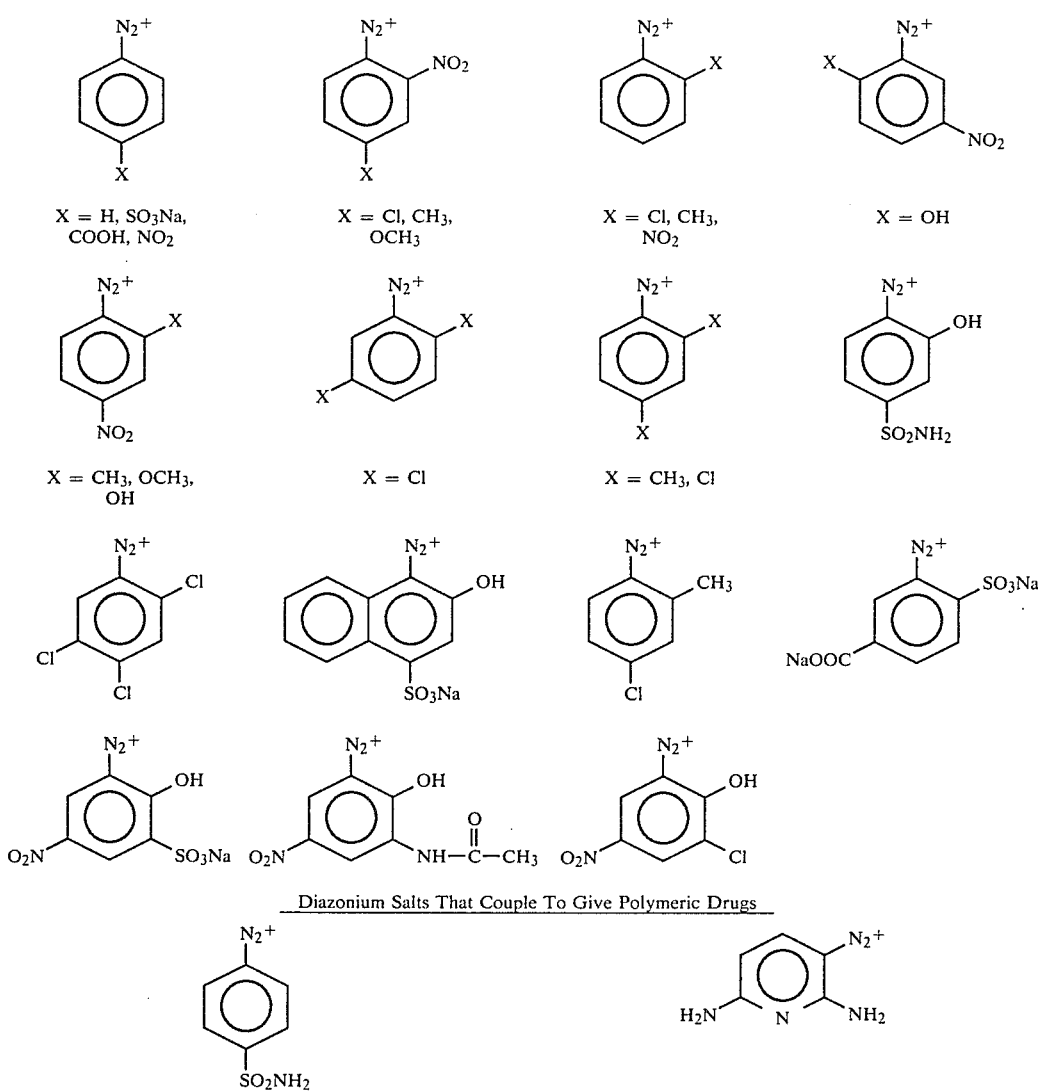

Diazonium Salts That Couple To Give Polymeric Drugs

PREPARATIVE METHODS

As a general method, the products of this invention can be prepared by reacting a backbone with diketene,

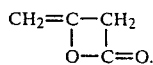

This reaction is an acylation reaction. Depending upon the type of backbone employed and whether a carbon or nitrogen being acylated, the conditions are more or less strenuous.

When a nitrogen (amine) is being acylated, low to moderate temperatures, for example 0° C. to 25° C., are used as are aqueous reaction media and pH's of 6–12. It is advisable to add the diketene gradually and to maintain the pH at as low a level as will not result in substantial protonation of the amine, by simultaneous base (NaOH, KOH etc.) addition. The acylation of polymeric aromatic hydrazines can be carried out by heating the polymer to 75°–100° C. in a nonaqueous solvent (toluene-dioxane) and gradually adding the diketene and allowing the required dehydration to a pyrazolone to form; this reaction usually requires 2 to 5 hours to complete.

With oxygen-containing groups like alcohols, somewhat more strenuous conditions are employed—temperatures of from 45° C. to 125° C., a strong acid catalyst such as benzenesulfonic acid, and a nonaqueous solvent like DMSO. With carbon acylations, like acylation of poly(styrene), temperatures of from 45° C. to 125° C., anhydrous conditions, nitrobenzene or chloroform or the like as solvents and a Friedel-Crafts catalyst such as $AlCl_3$ are employed. In general terms the reaction with amines is fast—being complete in from a few minutes to an hour or so. The other reactions are slower—being complete in 1 to 6 hours. In most cases, it is generally preferred to use a molar excess of diketene—usually 1.5 to 5 equivalents based on available acylation sites, although with the hydrazines, lower amounts—usually less than 2 equivalents—are employed.

ILLUSTRATIVE EMBODIMENTS

A number of examples of suitable backbones, their reaction with diketene and their use in forming aminosalicylic acid releasing materials are given. These are merely representative and are not to be construed as limiting the scope of the backbones useful in the practice of this invention or their use. It is considered that the present invention involves a general class of active methylene-containing polymers and not merely a particular backbone or group attached to the active methylene. Accordingly, other art-known backbones or attached groups could be employed as well as the materials herein specifically embodied.

In these and all the other embodiments, only one polymer repeat unit is shown. This is done for simplicity. It will be appreciated that the several reactions may not be completely quantitative in yield. Accordingly, while the final product will have the unit shown as a recurring unit, it may also have minor amounts of other unreacted precursor units. In Embodiment 1, for example, the product might be expected to have three different units in an overall structure:

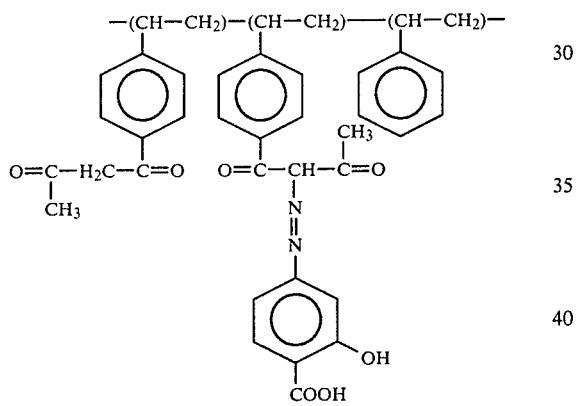

If, as is possible in accord with this invention, copolymeric groups were present, these would comprise a fourth recurring unit. It will be further appreciated that, since the end product-containing units are the desired species, it is generally desired to maximize the proportion of this unit and minimize the residual precursor units. Preferably, the end product containing units make up at least 33% (more preferably from 40 to 100%) of the maximum number theoretically possible.

The end product units represent the active units. As such, in practice, it may be of importance to assay for their presence as well as for the presence of other units in the polymer. Conventional analytical techniques known to the art will serve for these determinations. Representative analytical methods include the following:

Azo bond content is determined by reductive titration with chromous ion.

Carboxylic Acid Moiety on polymer is determined by titration with tetrabutylammonium hydroxide in DMSO.

Aliphatic Amine is determined by a modified van Slyke method in which primary aliphatic amine is converted to $N_2$ gas. Measured volume of evolved $N_2$ is used to quantitate original and residual amounts of polymeric primary aliphatic amine.

EMBODIMENT 1

Backbone: Polystyrene

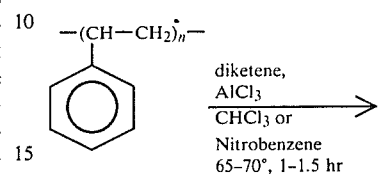

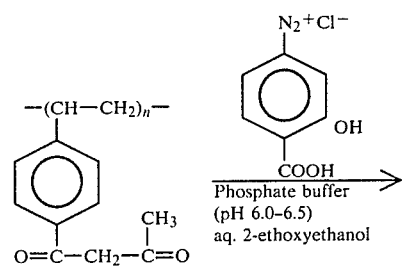

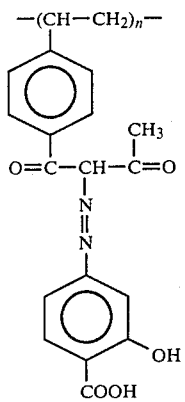

EMBODIMENT 2

Backbone: Poly(vinylamine) prepared such as by the method of U.S. Pat. No. 4,018,826.

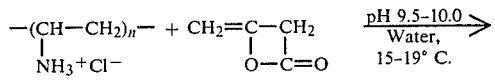

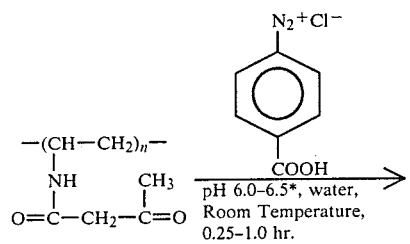

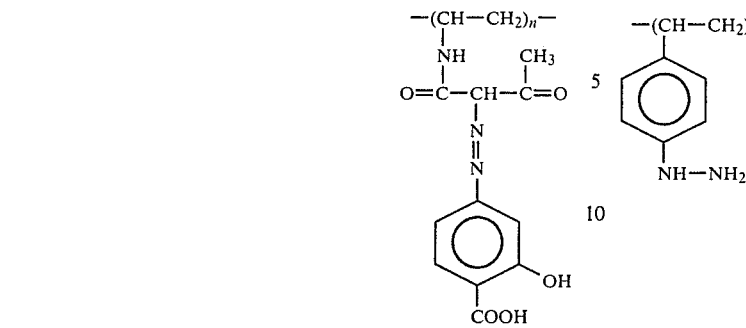

*In these embodiments, these pH's are used with the diazonium salt of a 4-aminosalicylic acid. With that of 5-aminosalicylic acid, pH's from 8.0-9.0 are preferred.

EMBODIMENTS 3, AND 4

Backbone: The same as in Embodiment 2 except that the following units are copolymerized with the vinylamine units.

Embodiment 3—Acrylic acid (10-60 mole% basis number of total vinyl units). Such backbone materials and their preparation are shown in U.S. Pat. No. 3,920,855.

Embodiment 4—Vinyl sulfonate (30-60 mole% basis number of total vinyl units). Such copolymers and their preparation are shown in U.S. Pat. No. 4,096,134.

EMBODIMENT 5

Backbone: Poly(vinyl alcohol)

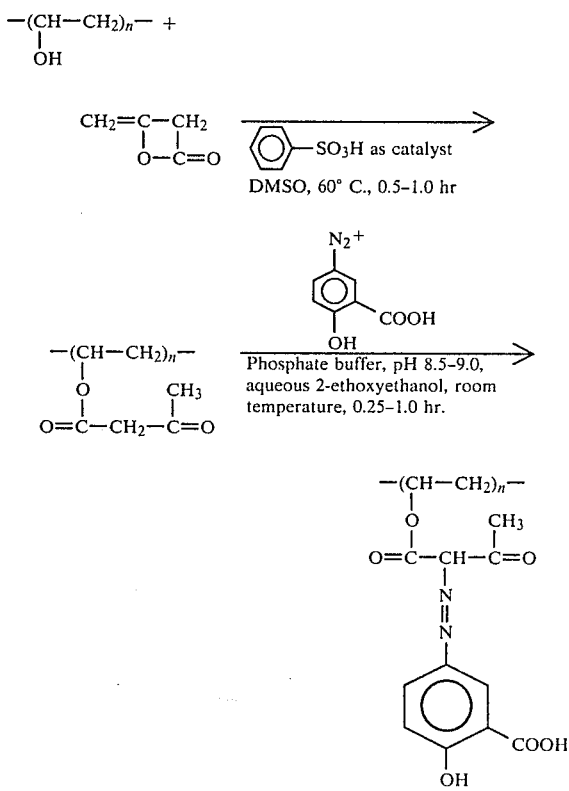

EMBODIMENT 6

Backbone: Poly(vinyl phenylhydrazine)

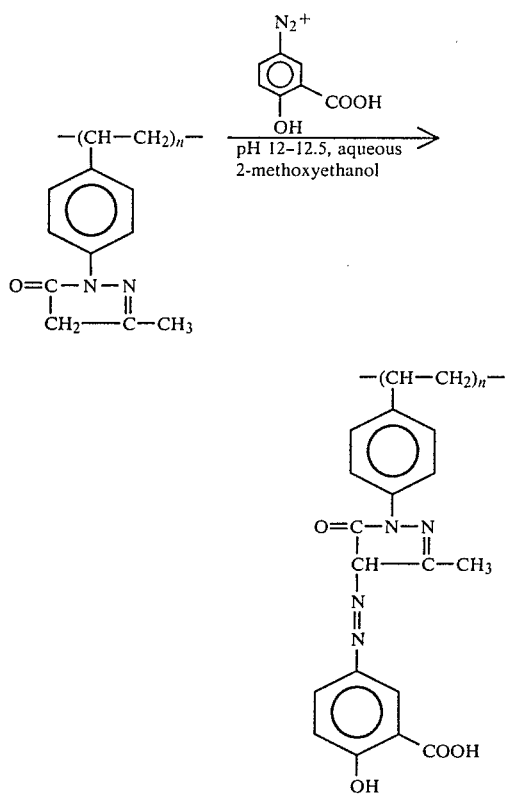

USE OF THE PREFERRED SALICYCLIC ACID CONTAINING POLYMERS

The salicyclic acid polymer embodiments of this invention have the property of undergoing reductive cleavage of their azo bonds at conditions found in the lower intestinal tract of mammals. The aminosalicylic acid moiety so liberated thus is available to function as a therapeutic agent on the mucosa of the lower intestinal tract or to pass through said mucosa for systemic therapy.

The salicylic acid polymer compounds may be presented in association with a pharmaceutically acceptable carrier in pharmaceutical formulations suitable for oral or rectal administration. Suitable carriers include solids such as lactose, starch (pharmaceutical grade), dicalcium phosphate, calcium sulfate, kaolin, mannitol and powdered sugar; liquids; and gels of the like.

The formulations for oral or rectal administration are advantageously presented in discrete unit dosage forms, such as tablets, capsules, cachets, or suppositories, each containing a predetermined amount of each compound, but may also be presented as a powder, or as granules. They may as well be presented as a solution or suspension in an aqueous or non-aqueous liquid such as would be useful for oral or rectal administration. The formulations may be made by any of the known methods and may include one or more of the following accessory ingredients: buffers, flavoring, binding, dispersing, surface-active, thickening, lubricating and coating materials, preservatives, bacteriostats, antioxidants, suppository and ointment bases, coloring agents, and any other acceptable excipients. Unit dosage forms may typically contain from about 0.01 to about 1 gram of releasable aminosalicylic acid.

Any skilled artisan can prepare these dosage forms by simply referring to the oral dosage form preparatory procedure outlined in "Remington's Pharmaceutical Sciences," Fourteenth Edition (1970), pages 1624 through 1698 inclusive, and the rectal dosage form preparatory procedure outlined in the same text at pages 1617 through 1624, inclusive.

The aminosalicylic acid releasing compositions of this invention find application in the treatment of inflammations, especially intestinal inflammations such as colitis, in man and other mammalian species. The 5-aminosalicylic acid-releasing compositions are especially indicated in the treatment of ulcerative colitis. The therapeutic dosage range for compositions containing the present polymers will vary with the degree of substitution of the polymer with releasable amino-salicylic acid units as well as the size and needs of the patient. With a related monomeric compound, salicylazosulfapyridine (SASP) the maximum recommended dose for a 70 kg adult male is 8 g/day with 5 g/day being a preferred maximum. These values are equivalent to 114 mg of SASP/kg of body weight/day and 71.4 mg/kg/day or 0.29 and 0.18 mmoles of SASP/kg of body weight/day. One would expect similar molar doses of the present materials in the range of 0.05 to 1.00, preferably 0.10 to 0.50 and more preferably 0.15 to 0.25 mmoles/kg/day to be effective.

The invention will be further described by the following examples. They are intended solely to exemplify the invention and are not to be construed as limiting its scope.

EXAMPLE I

A. Active Methylene-Group-Containing Polymer Preparation

A vinylamine/sodium vinyl sulfonate copolymer as described in U.S. Pat. No. 4,096,134 of Otteson, et al, and having a molecular weight of about 40,000 was obtained. This polymer (36.20 g) provided 50.0 mmoles of available amine units and was dissolved in 300 ml of water in a beaker. The solution was brought to pH 11.0 with aqueous HCl and 22.5 ml (about 280 mmol) of diketene was gradually added. The reaction temperature was held between 17°–19° C. Aqueous NaOH was added simultaneously as needed to hold the pH at 11.0–11.5. The pH was then held at 12.0 while 1.5 ml additional diketene was added (the total amount of diketene was 300 mmoles). The mixture was then stirred at 18° C. at pH 12.0 for 3 min, acidified to pH 6.5 with HCl, filtered, and ultrafiltered in a laboratory scale unit using a membrane having a 10,000 MW cutoff to remove salts and side products. The retentate was filtered and freeze-dried to yield a water soluble polymer of the structure

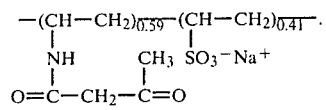

This product provides a plurality of active methylene groups as possible attachment points.

B. Preparation of Coupling Agent

Aqueous HCl (6N), 1.23 ml, was placed in a 50 ml flask and chilled to 0° C. Separately, 0.163 (1.94 mmol) of NaHCO₃ was dissolved in 4 ml of water also chilled to 0° C. 4-Aminosalicylic acid,

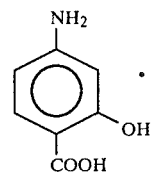

(0.269 g, 1.76 mmole) was added to the chilled bicarbonate in small portions followed by 0.134 g (1.94 mmol) of NaNO₂. This homogeneous solution was gently pipetted into the chilled HCl in 0.5 ml portions to give about 1.8 mmol of

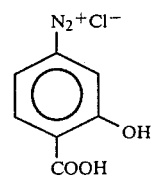

as a suspension.

C. Addition of Coupling Agent

The polymer of Part A, (0.128 g) was dissolved in 5 ml of water. Sodium dihydrogen phosphate monohydrate (0.693 g) was added. The pH of the resulting mixture was brought from 4.5 to 6.0 with 6N NaOH. Then over a 10 minute period, the diazonium salt suspension of part B was added, together with 6N NaOH as needed to hold the pH at 6.0–6.3. The mixture was stirred at room temperature for an hour, filtered, diluted, ultrafiltered (as in Part A), and the retentate was filtered and freeze-dried to give 0.199 g of a product which by elemental analysis and titration of

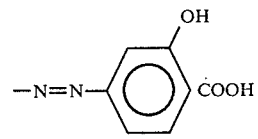

groups is determined to be

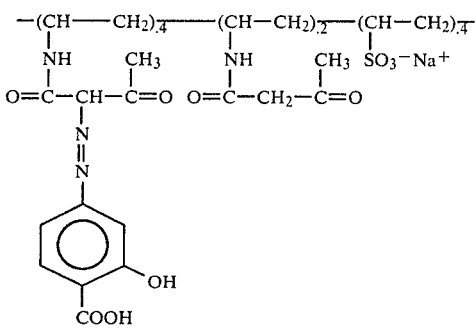

D. Use of the product

4-Aminosalicylic acid is known to be a beneficial pharmeceutical agent. The polymer of Part C is of a size that precludes its absorption through the walls of the gastrointestinal tract. The polymeric form also reduces or eliminates stomach disorders and other G.I. tract side effects associated with 4-aminosalicylic acid therapy. When the polymer is exposed to the environment of the lower bowel the azo bonds are cleaved, releasing the 4-aminosalicylic acid,

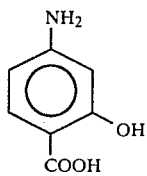

for local action in the lower bowel and also for absorption through the G.I. tract walls to provide systemic action.

The ability of mammalian G.I. tract microflora to cleave the polymeric azo bonds and thus release attached aminosalicylic acids can be demonstrated in vitro as follows:

Cecal contents are removed from a freshly sacrificed rat, suspended in VPI dilutent and filtered under $N_2$. Five ml of the cell suspension (1 g fresh weight/25 ml) is then added to 0.05 ml of 20 w% α-D-glucose, 0.5 ml 1.0 mM benzylviologen or distilled water and 2.5 ml of a solution of an azo linked salicylic acid polymer product in screw cap tubes. The tubes are purged for a few minutes with $N_2$, sealed and incubated for 48 hours at 35° C. Samples are removed from the tubes periodically by hypodermic needle and syringe in order to measure azo reduction by decrease in absorbance at the $\lambda_{max}$. It will be observed that in the absence of the redox mediator dye benzylviologen, the polymeric compounds azo bond content is reduced about 50% in 6 hours. In the presence of benzylviologen the polymer's azo bond are completely reduced by the bacteria in less than two hours.

Such findings are consistent with those obtained with a number of polymeric azo dyes studied previously. [Brown, J. P., "Reduction of polymeric azo dyes by cell suspensions of enteric bacteria," *Abstr.An.Meet. Amer.- Soc.Microbiol.*, p. 123 (1976); Brown, J. P.; Wilcox, A. S.; and MacMillan, J. M., "The redox shuttle: A novel mechanism for the extracellular reduction of azo and nitro xenobiotics by intestinal bacteria." *Abstr.XII Inter.Cong.Microbiol.*, Munich, p. 117 (1978)].

The applicability of in vitro studies of azo bond reduction to simulate in vivo reduction has also been demonstrated by studies of the intestinal absorption of reduction products of orally-administered azo dyes (Honohan, T., et al, "Intestinal absorption of polymeric derivatives of the food dyes Sunset Yellow and Tartrazine in rats," *Xenobiotica*, 7:765 (1977).

EXAMPLE II

A. Polymer Preparation

Poly(vinylamine) hydrochloride (0.79 g) produced by the general process taught by Gless, et al, in the U.S. Pat. No. Re. 30,362 and having a molecular weight of 140,000 was dissolved in 200 ml of water. The solution pH was brought to 10.0 with 6N NaOH. The solution was held at 17°–18° C. and stirred rapidly. Diketene (4.0 ml) and about 8 ml of 6N NaOH were gradually added over 25 minutes so as to maintain the pH at about 10.0. The mixture was stirred at 17°–18° C. for five minutes. The pH was lowered to 6.5 with HCl and the product recovered by filtering the reaction mixture, diluting and ultrafiltering the filtrate (as shown in Example I) and filtering the retentate. The retentate was diluted to 500 ml. A 20 ml portion was freeze dried to give 0.046 g of the product

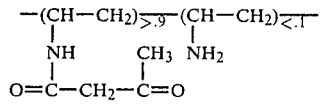

Fifty ml of the remaining material was mixed with 5 ml of 2-ethoxyethanol and evaporated to about 8 mls.

B. Preparation of Coupling Agent

The preparation of Part B, Example I was repeated to give a solution containing about 3 mmole of

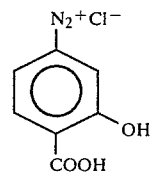

C. Addition of the coupling agent.

The 8 ml of concentrate prepared in Part A was placed in a beaker with about 2 ml of rinse water and 1.18 g of $NaH_2PO_4.H_2O$. The solution's pH was brought to 6.3 with NaOH. Then the diazonium salt of Part B was carefully pipetted into the mixture in 0.5–1.0 ml portions along with 6N NaOH to hold the pH at 6–6.3 over a 10 minute period. The mixture was stirred at room temperature for 5 minutes then filtered, ultrafiltered, filtered and freeze dried to afford 0.244 g of the product

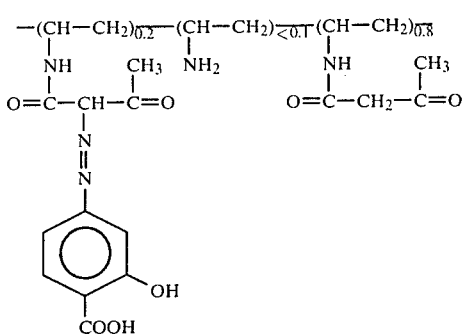

D. If tested as in Part D of Example I, the product of Part C would exhibit the same behavior, being nonabsorbable from the mammalian G.I. tract when intact but undergoing azo bond cleavage in the lower bowel to release 4-aminosalicylic acid.

EXAMPLE III

Poly(vinyl alcohol), 8.8 g (20 mmol) is dissolved in 100 ml of dimethylsulfoxide (DMSO) containing 10 mg of benzenesulfonic acid. To the stirred suspension at 60°, is added 0.67 g (80 mmol) of diketene dropwise. The mixture is heated at 60° for 5 hours. Care is taken so that the temperature of the reaction mixture does not rise above 70° C. during the entire course of the reaction. The cooled reaction mixture is diluted, filtered, ultrafiltered, and freeze dried. The initial polymer product would have the structure

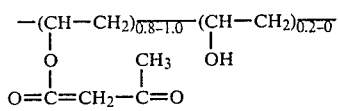

When coupled to the diazonium salt derived from 4-aminosalicylic acid, the following product would result:

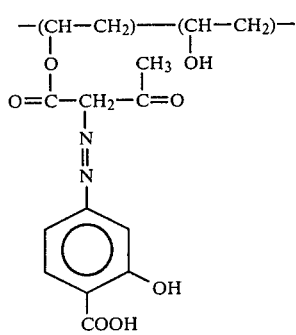

EXAMPLE IV

The preparation of Example I is repeated with the following changes: In Part B, instead of 4-aminosalicylic acid, 5-aminosalicylic acid is diazotized. This diazonium salt,

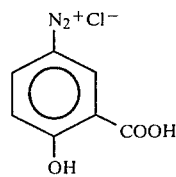

is coupled to the active methylene group containing polymer at pH 9 to give

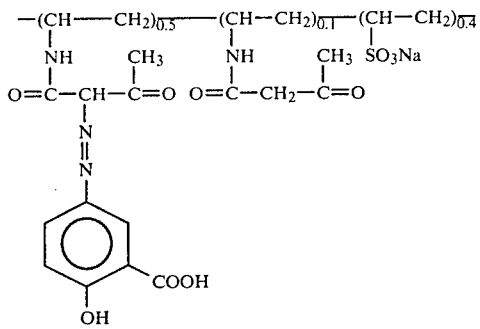

Such a product releases 5-aminosalicylic acid at the conditions of the mammalian lower bowel.

EXAMPLE V

The preparation of Example IV is repeated substituting

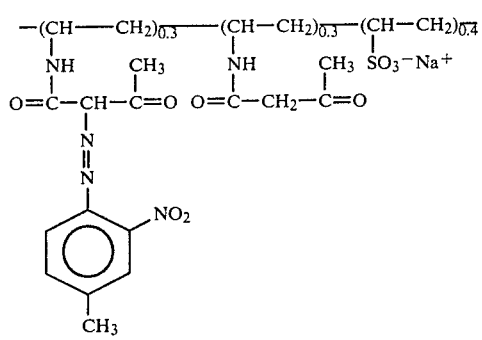

for the diazonium salt of 4-aminosalicylic acid. This yields as a product

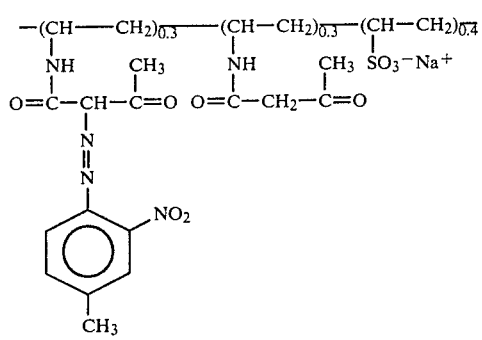

which is bright yellow in color and useful as a polymeric colorant for various substrates including paper, fibers, and the like.

EXAMPLE VI

The acylation of poly(styrene) is expected to proceed as follows:

Poly(styrene) of molecular weight 25,000, 2.08 g (20 mmol), is dissolved in 100 ml of nitrobenzene. To the solution is added 5.32 g (40 mmole) of anhydrous aluminum chloride. Over a period of 10 minutes, 1.68 g (20 mmol) of diketene is added dropwise with stirring, while the temperature is kept between 45° C. and 50° C. When all the diketene has been added, the reaction mixture is heated with stirring at 65°–75° C. for 2 hours. The cooled reaction mixture is evaporated under high vacuum to dryness. The residue is dissolved in 2,4-pentanedione, washed once with dilute HCl, three times with brine, dried over anhydrous sodium sulfate then evaporated to dryness to give

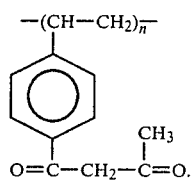

This material is dissolved in aq. 2-ethoxyethanol and used as in step C of Example II to give a product of the structure

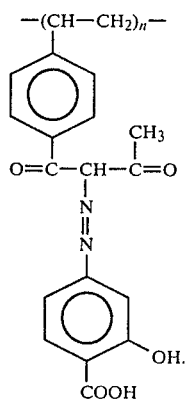

EXAMPLE VII

The acylation of a polymeric hydrazine would be expected to proceed as follows: Polymeric phenylhydrazine (2.68 g, 20 mmol) of the structure

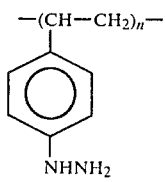

is stirred in 100 ml of 1:1 toluene:dioxane. To the mixture at 80°, add dropwise 1.68 (20 mmol) of diketene. The mixture is heated at 80°–85° C. for 4 h, cooled to room temperature, extracted into 0.01N NaOH, ultrafiltered, filtered, and freeze dried to give

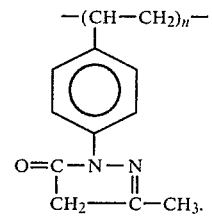

Such a product couples to diazonium salts such as set forth in Examples II and VI.

What is claimed is:

1. A polymer comprising a repeat unit of the structure

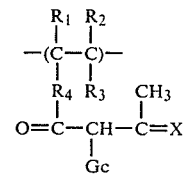

wherein X is O or N— and each of $R_1$, $R_2$, and $R_3$ is independently selected from among hydrogen and 1 to 4 carbon lower alkyls, $R_4$ is selected from among

aromatic amines and aromatic hydrazines which additionally provide X as N— and Gc is an organic group.

2. The polymer of claim 1 wherein X is O.

3. The polymer of claim 1 wherein Gc is an azo linked salicyclic acid of the structure

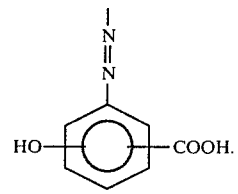

4. The polymer of claim 3 wherein the azo-linked salicyclic acid has the structure

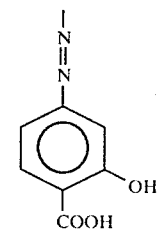

5. The polymer of claim 3 wherein the azo-linked salicyclic acid has the structure

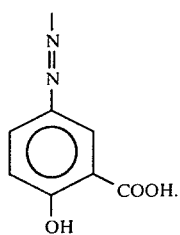

6. An azo-containing polymer comprising a repeat unit of the structure

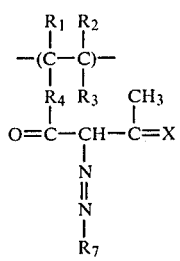

wherein X is O or N— and each of $R_1$, $R_2$, and $R_3$ is independently selected from among hydrogen and 1 to 4 carbon lower alkyls, $R_4$ is selected from among —O—,

aromatic amines and aromatic hydrazines which additionally provide X as N and $R_1$ is an aromatic group.

7. The azo-containing polymer of claim 6 wherein $R_1$, $R_2$ and $R_3$ are hydrogen X is O and $R_4$ is O.

8. The azo-containing polymer of claim 6 wherein $R_1$ $R_2$ and $R_3$ are hydrogens, X is O and $R_4$ is

9. A polymer comprising repeat units of the structure

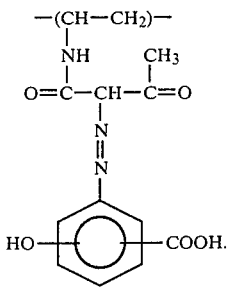

10. The polymer of claim 9 wherein said repeat units have the structure

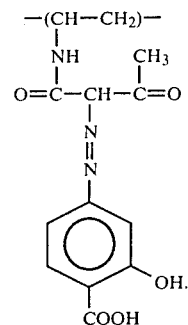

11. The polymer of claim 9 wherein said repeat units have the structure

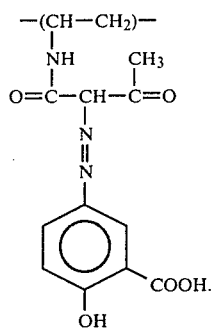

12. The polymer of claim 9 additionally comprising repeat units of the structure

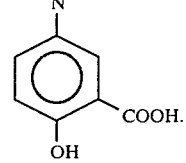

wherein $M^+$ is a pharmaceutically acceptable metal cation.

13. The polymer of claim 9 additionally comprising repeat units of the structure

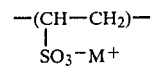

14. The polymer of claim 9 additionally comprising the repeat unit of the structure

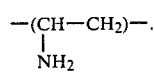

15. The polymer of claim 12 additionally comprising the repeat unit of the structure

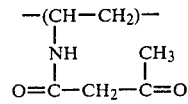

16. A pharmaceutical composition comprising a therapeutically effective amount of the polymer of claim 9 in admixture with a pharmaceutically acceptable carrier.

* * * * *